UNITED STATES PATENT OFFICE.

HOMER T. YARYAN, OF TOLEDO, OHIO.

PROCESS OF PURIFYING ROSIN.

No. 915,401.

Specification of Letters Patent.

Patented March 16, 1909.

Application filed September 30, 1908. Serial No. 455,459.

*To all whom it may concern:*

Be it known that I, HOMER T. YARYAN, a citizen of the United States, residing at Toledo, in the county of Lucas and State of Ohio, have invented a certain new and useful Process for Purifying Rosin; and I do declare the following to be a full, clear, and exact description of the invention, such as will enable others skilled in the art to which it appertains to use the same.

When rosin is extracted from stumps and dead timber of resinous woods, the product has impurities and is of objectionable color, which lower the grade of the rosin and lessen its value. This is due, largely, to the fact that these woods have usually been swept by flames which burned the outside of the timber. There appears to be a zone, lying next to the charred wood, containing rosin which is affected by the heat, thus forming pitch and converting some of the abietic acid into colophonic acid. In the treatment of these woods with a hydrocarbon solvent for the purpose of recovering the rosin, the solvent dissolves these objectionable impurities which now mix with and remain in the recovered rosin, impairing its color and lowering its grade. After the rosin has become discolored by the presence of these objectionable substances it has heretofore been found commercially impracticable to purify the rosin and to give it the desired color.

My invention relates to and its object is to provide a process for overcoming the objections and difficulties here pointed out and by means of which the impurities in rosin may be eliminated.

In practicing my process, I dissolve the rosin in about four parts of hydrocarbon solvent. This solution is treated by agitation with sulfuric acid of about sixty-six per cent. strength. After decanting I again treat the solution with an acid of eighty per cent. strength until the required color is obtained. No stated quantity of acid can be named as different rosins require various quantities. After again decanting the solution, I thoroughly wash it with pure water to remove any remaining trace of acid and then evaporate the solvent in the usual or any preferred manner to recover the rosin.

I do not confine my invention to the purification of rosin recovered from stumps and dead wood, as it is evident that dark grades of rosin of commerce, obtained or recovered in any manner, may be dissolved in a hydrocarbon solvent and then purified as above described.

Having described my invention, what I claim and desire to secure by Letters Patent is,—

The process of purifying colophony or rosin, which consists in treating with sulfuric acid a solution of such rosin in a hydrocarbon solvent.

In testimony whereof I affix my signature in presence of two witnesses.

HOMER T. YARYAN.

Witnesses:
CLAYTON MURPHY,
ADA E. CAMERON.